United States Patent [19]

Bauman

[11] Patent Number: 4,568,871
[45] Date of Patent: Feb. 4, 1986

[54] BALANCING SYSTEM FOR LIMITING VOLTAGE IMBALANCE ACROSS SERIES-CONNECTED CAPACITORS

[75] Inventor: Bruce K. Bauman, Glen Rock, Pa.

[73] Assignee: Borg-Warner, Chicago, Ill.

[21] Appl. No.: 574,222

[22] Filed: Jan. 26, 1984

[51] Int. Cl.[4] ................................................ G05F 3/08
[52] U.S. Cl. .................................... 323/364; 333/181; 363/37; 363/48
[58] Field of Search ........................ 363/37, 44, 47, 48, 363/68; 333/181; 361/328, 329; 318/803; 323/230, 364, 370; 307/318

[56] References Cited

U.S. PATENT DOCUMENTS

| | | | |
|---|---|---|---|
| 1,686,022 | 10/1928 | Marbury | 323/370 |
| 2,737,625 | 3/1956 | Felici | 323/370 |
| 3,358,220 | 12/1967 | Fahlen | 323/370 |
| 3,373,335 | 3/1968 | Rosenberg | 363/68 |
| 4,333,046 | 6/1982 | Lee | 323/231 |

FOREIGN PATENT DOCUMENTS

| | | | |
|---|---|---|---|
| 71277 | 5/1982 | Japan | 363/37 |
| 446559 | 5/1936 | United Kingdom | 333/181 |

OTHER PUBLICATIONS

Electronic Design, vol. 16, No. 1, p. 154, Jan. 4, 1968.

Primary Examiner—William H. Beha, Jr.
Attorney, Agent, or Firm—James E. Tracy

[57] ABSTRACT

When a series string of similar circuit components, such as capacitors, are connected across a source of d-c voltage and those circuit components do not divide the applied voltage equally because of having different leakage resistances, and consequently different leakage currents, the voltage imbalance may become so great that the maximum allowable voltage or voltage rating of at least one of the circuit components may be exceeded, resulting in damage to or the destruction of that component. To limit the voltage imbalance, thereby to protect the circuit components, each of those components is shunted by a separate voltage limiting device, such as a zener diode. The threshold or breakdown voltage of each limiting device is less than the maximum acceptable voltage of the device's companion circuit component so the voltage across that component will be limited to and will never be greater than that maximum acceptable level regardless of the differences that exist in the leakage resistances.

1 Claim, 1 Drawing Figure

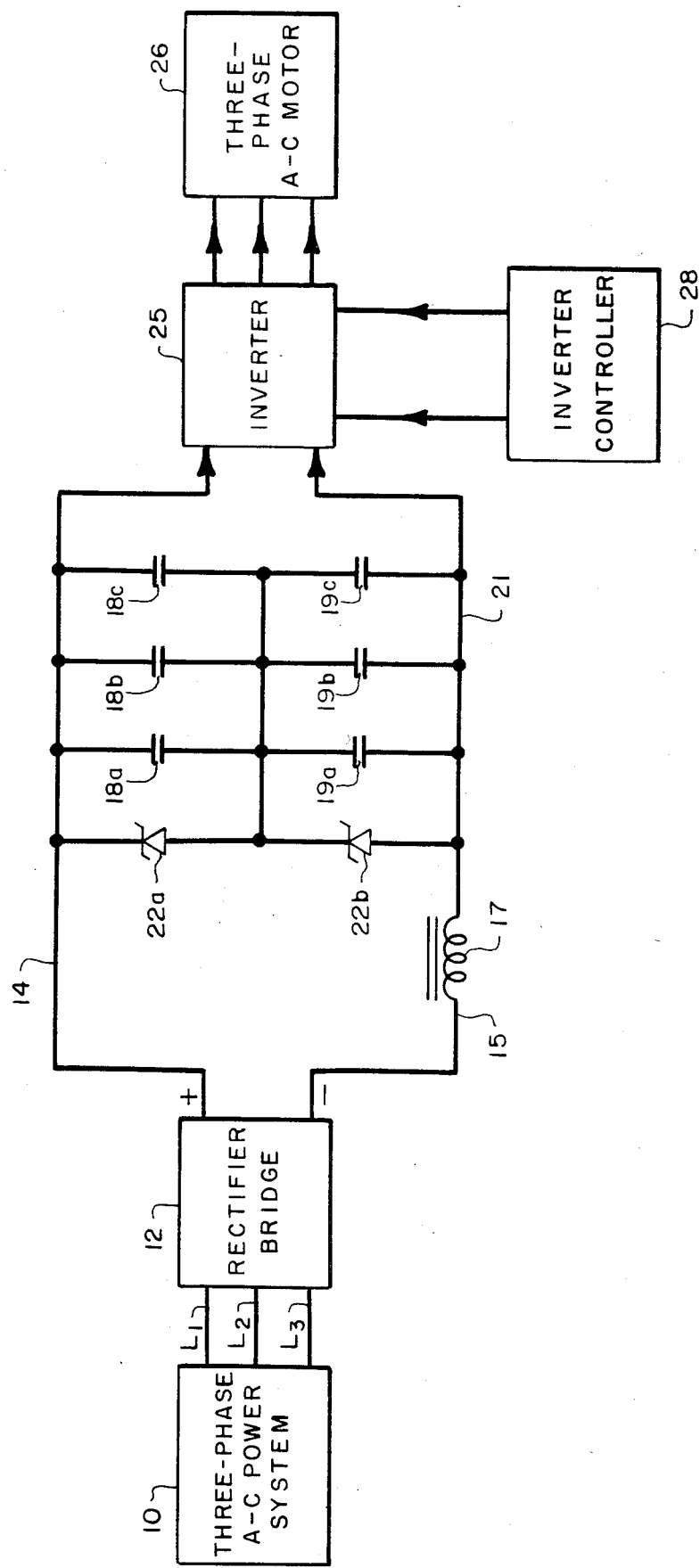

BALANCING SYSTEM FOR LIMITING VOLTAGE IMBALANCE ACROSS SERIES-CONNECTED CAPACITORS

BACKGROUND OF THE INVENTION

This invention relates to a balancing system for improving the balance of an applied d-c voltage across a string of series-connected, generally similar circuit components, such as capacitors, where the circuit components have different I-V (current versus voltage) characteristics and different leakage resistances which prevent natural voltage sharing or equal division.

It is particularly important to balance the d-c voltage across a series string of capacitors which provide the capacitance of an LC filter at the output of a large A-C to D-C power converter to which is applied a-c line voltage. In a large A-C to D-C power converter (for example, where 460 volts three-phase a-c is converted to about 620 volts d-c), the filter usually includes a number of capacitors connected in series to provide a sufficient voltage rating, and then at least one additional series string of the same number of capacitors is connected in parallel with the first string in order to obtain the required capacitance. Although the individual capacitors in the series/parallel bank will ordinarily be of similar construction, having the same capacitance and voltage rating, their leakage resistances, and hence leakage currents, will likely differ. This is especially true when the capacitors are of the electrolytic type. In the absence of any balancing arrangement, the leakage current differences between the capacitors could cause a large voltage unbalance across the capacitors In other words, if the leakage resistances are different, the d-c voltage across a series string of capacitors will not divide or be shared equally by all of the capacitors The voltage across one of the capacitors could be sufficiently high to exceed the capacitor's voltage rating, thereby damaging or destroying the capacitor.

The traditional method in the past of balancing the voltage (or more accurately reducing the voltage imbalance) across a series string of capacitors is to place a resistor in parallel with each set of capacitors, a set comprising the corresponding individual capacitors in each series string which will be parallel connected. In effect, each set of parallel capacitors constitutes one capacitor The resistor added across each set is substantially smaller than the parallel combination of the leakage resistances in the set so that the resistor will determine the effective resistance of the set. As a result, the effective resistances of the various sets, or composite capacitors, may be somewhat equalized. Unfortunately, these additional resistors, shunting the capacitors, dissipate a substantial amount of power. The larger the possible mismatch in leakage current, the smaller the value of the resistors that must be used to force voltage balancing, and the greater the power loss The balancing system of the present invention is a substantial improvement over those previously developed in that voltage balancing across a series string of capacitors is achieved by means of a network which dissipates a very small amount of power compared to the prior systems.

SUMMARY OF THE INVENTION

The invention provides a balancing system for limiting the voltage imbalance across a string of a plurality of series-connected circuit components, such as capacitors, when a d-c voltage is applied across the series string, the circuit components being of generally similar construction but having different current versus voltage characteristics and different leakage resistances. The balancing system comprises a plurality of series-connected voltage limiting devices, such as zener diodes, each of which switches from a high impedance state to a low impedance state when the voltage across the device is of a predetermined polarity and has a magnitude exceeding a given breakdown or threshold level. Means are provided for coupling the series string of voltage limiting devices across the series string of circuit components, or capacitors, with each limiting device shunting an associated respective one of the circuit components. With this arrangement, each voltage limiting device switches to its low impedance state whenever the voltage across its associated shunted circuit component reaches the device's threshold level, thereby limiting the maximum voltage across each circuit component despite wide differences in the current versus voltage characteristics and leakage resistances of the circuit components.

DESCRIPTION OF THE DRAWING

The features of the invention which are believed to be novel are set forth with particularity in the appended claim. The invention may best be understood, however, by reference to the following description in conjunction with the accompanying drawing which schematically illustrates an a-c line voltage energized d-c power supply, having an LC output filter with a series string of capacitors, which in turn drives an inverter-motor load, a balancing system, constructed in accordance with one embodiment of the invention, being provided for limiting the voltage imbalance across the capacitors.

DESCRIPTION OF THE ILLUSTRATED EMBODIMENT

Referring to the drawing, three-phase a-c line voltage is received over line conductors $L_1$, $L_2$ and $L_3$ from a conventional three-phase a-c power distribution system 10, the magnitude of the line voltage taking any appropriate value depending on the characteristics of the load to be driven. For example, in a 50 horsepower inverter drive the a-c line voltage will probably have a magnitude of around 460 volts. Line conductors $L_1$, $L_2$ and $L_3$ connect to a conventional rectifier bridge 12 which rectifies the three-phase a-c line voltage to produce a d-c voltage of fixed amplitude across conductors 14 and 15, the voltage being of positive polarity on conductor 14 with respect to conductor 15.

In order to filter and smooth the d-c voltage across conductors 14 and 15, a low pass LC filter is provided at the output of rectifier bridge 12. The series-connected inductance of the filter is provided by inductor or choke 17, while the filter's shunt-connected capacitance is formed by the series/parallel bank of six individual capacitors 18a, 18b, 18c, 19a, 19b and 19c of generally similar construction and each having the same voltage rating (namely the maximum allowable voltage) and capacitance. Six capacitors are employed to show, by way of example, how a relatively high capacitance and voltage rating may be obtained. The capacitors are connected in three series strings (18a and 19a, 18b and 19b, and 18c and 19c) to provide a voltage rating for the filter capacitance which is double that of an individual capacitor. At the same time, the capacitors are paralleled into two sets (18a, 18b and 18c as one set and 19a, 19b and 19c as the second set) to triple the capacitance compared to that of an individual capacitor. In effect, the parallel-connected capacitors 18a, 18b and 18c form one larger capacitance capacitor, while capacitors 19a, 19b and 19c form a second larger capacitance capacitor. Thus, the circuit may be considered as having only two capacitors (18a–18c and 19a–19c) connected in series across conductors 14 and 21. If it is assumed that the invention is incorporated in a 50 horsepower drive, the d-c voltage across conductors 14 and 21 will normally be about 620 volts. In that environment, the voltage rating, or maximum acceptable voltage, of each individual capacitor would be around 400 volts.

Ignoring for now the effect of zener diodes 22a and 22b, a filtered d-c voltage of constant magnitude will be applied across conductors 14 and 21 to inverter 25 which may be of the pulse width modulated type in order to convert the d-c voltage to three-phase alternating voltage for application to three-phase a-c motor 26. In brief, inverter 25 will comprise a family of switching devices that are turned on and off in the correct sequence and at the correct times, by triggering pulses from inverter controller 28, to convert the fixed amplitude d-c voltage to a-c voltage as applied to the windings of motor 26, thereby delivering alternating current to the windings to effect rotation of the motor at a speed determined by and directly proportional to the frequency of the inverter output a-c voltage. Hence, controller 28 determines the motor speed. A manual adjustment may be included to affect the operation of the controller, or it may be controlled in response to some sensed parameter or characteristic of the system, in which the disclosed inverter drive is incorporated, in order to automatically control the motor speed in accordance with the sensed information.

The construction of inverter controller 28 is, of course, well-known to those skilled in the art. The triggering pulses produced by controller 28 are appropriately programmed to control the duty cycles of the switching devices in the inverter so that the amplitude of the a-c voltage applied to the motor will be changed when the frequency of that a-c voltage is varied. Preferably, the switching devices in inverter 25 are controlled by controller 28 to maintain a substantially constant ratio of amplitude to frequency of the inverter output voltage. By maintaining a fixed ratio of the amplitude of the inverter output voltage relative to its frequency, overheating of motor 26 will be avoided and the motor will be provided with a constant torque output capability regardless of motor speed.

Consideration will now be given to the invention. Although each of the six individual capacitors 18a–18c and 19a–19c have the same capacitance and voltage rating, they probably would have different leakage resistances and thus different I-V or current versus voltage characteristics. As a consequence, the effective leakage resistance across the capacitor set 18a–18c could be substantially different than that across capacitor set 19a–19c. To balance the d-c voltage across that series string of capacitors, or more precisely to limit the voltage imbalance across the capacitors, in accordance with the invention zener diodes 22a and 22b, rather than resistors as in the prior art, are shunted across the two capacitor sets. A major advantage of the invention is that the power dissipation in the balancing network is significantly reduced.

As indicated by the I-V characteristic of a zener diode, such a device acts like a regular diode and when a reverse (positive) voltage is applied to its cathode it will present a high output impedance, thereby conducting substantially no current. As the reverse voltage is increased to the zener diode's breakdown or threshold level, the diode breaks down and switches from its high impedance state to its low impedance state. If the applied voltage then increases, the current through the zener diode will increase but the voltage across the diode will remain substantially constant. In other words, the voltage drop across the zener diode will be limited or clamped essentially to the breakdown voltage, regardless of the magnitude of the voltage applied to or the current flowing through the diode.

The I-V characteristic of each zener diode 22a, 22b is selected so that the maximum voltage across its companion or associated capacitor set is limited to the maximum acceptable voltage (or voltage rating) for the capacitor when the zener diode is conducting the worst possible expected mismatch in leakage current. The power savings result because only one zener diode must conduct current to force voltage sharing and it must only conduct the difference between the leakage current of the two capacitors (namely, capacitor 18a–18c and capacitor 19a–19c). To explain further, if the magnitude of the a-c line voltage is normal and the effective leakage resistances across the two capacitors 18a–18c and 19a–19c are substantially the same, the d-c voltage across conductors 14 and 21 would divide substantially equally across the two capacitors, the breakdown voltages of zener diodes 22a and 22b would not be exceeded, and no current would flow through the diodes.

Assume now that the effective leakage resistance across capacitor 18a–18c is sufficiently less than that across capacitor 19a–19c that the voltage drop across capacitor 19a–19c increases to the breakdown level of zener diode 22b. The leakage current through capacitor 18a–18c will thus be greater than that through capacitor 19a–19c, the leakage current difference flowing through zener diode 22b. During this time, the voltage across capacitor 19a–19c will be clamped to the zener diode's breakdown voltage which is less than the capacitor's voltage rating. Of course, if the effective leakage resistance across capacitor 19a–19c is less than that across capacitor 18a–18c and diode 22a breaks down, the differential between the two leakage currents will now flow through diode 22a.

Thus, the zener diodes are only used when there is a difference in the leakage currents, and that current difference is conducted through one of the diodes to keep the capacitors below their voltage ratings. In the prior art the balancing resistors, that would be shunted across capacitors 18a–18c and 19a–19c, would both conduct current at all times to force voltage sharing, and the imbalance in leakage current between the capacitors would only be a very small portion of the total current in the resistors. It will thus be appreciated that in the balancing system of the present invention very little power must be dissipated in order to achieve voltage balancing across the capacitors.

It is to be noted that the balancing system is particularly attractive when the a-c line voltage is unusually high and the capacitors are very badly mismatched in terms of leakage current. If the d-c voltage across conductors 14 and 21 is normally 620 volts, it could go as high as 750 volts when the input line voltage is high. If the voltage rating of each capacitor is 400 volts, the zener diodes would operate so that none of the capacitors would exceed its rating despite wide differences in the leakage resistances.

Of course, the invention may be practiced when more than two capacitors are in the series string, in which case the same number of series-connected zener diodes would be needed. Moreover, each of the zener diodes illustrated in the drawing may actually comprise a plurality of series-connected zener diodes. This may be done in order to obtain the necessary zener diode characteristic at the required voltage using commercially available components.

It will be realized that while zener diodes are used to force voltage sharing between a series of capacitors, the basic principle of the invention can be extended to a far greater range of applications. The same concept can be used to force voltage sharing between any set of series-connected similar circuit components or elements, in an electrical circuit, which do not have I-V characteristics that result in natural voltage sharing. Some such circuit components are thyristors, transistors and diodes. Furthermore, zener diodes are not essential to effect voltage limiting across each of the series components. Any voltage limiting device with a similar I-V characteristic could be used, such as metal oxide varistors, spark gaps and neon bulbs.

While particular embodiments of the invention have been described, modifications may be made, and it is intended in the appended claims to cover all such modifications as may fall within the true spirit and scope of the invention.

I claim:
1. A balancing system for limiting the voltage imbalance across a string of a plurality of series-connected capacitors when a d-c voltage is applied across the series string, the capacitors being of generally similar construction and having the same voltage rating but having different leakage resistances, and hence different leakage currents, said balancing system comprising:
   a plurality of series-connected zener diodes each of which breaks down and switches from its high impedance state to its low impedance state when a reverse voltage, having a magnitude exceeding a given breakdown level, is applied across the diode;
   and means for coupling the series string of zener diodes across the series string of capacitors with each diode shunting an associated respective one of the capacitors, the zener diodes being poled so that the d-c voltage, applied to the capacitors, provides a reverse voltage on the diodes;
each zener diode breaking down and switching to its low impedance state whenever the voltage across its associated shunted capacitor reaches the diode's breakdown level which is less than the capacitor's voltage rating, the difference in capacitor leakage currents flowing through a zener diode which breaks down, thereby limiting and clamping the maximum voltage across each capacitor to a level less than the capacitor's voltage rating despite wide differences in the leakage resistances and leakage currents of the capacitors.

* * * * *